D. Tainter,
Carding Machine.
Nº 67,226. Patented July 30, 1867.
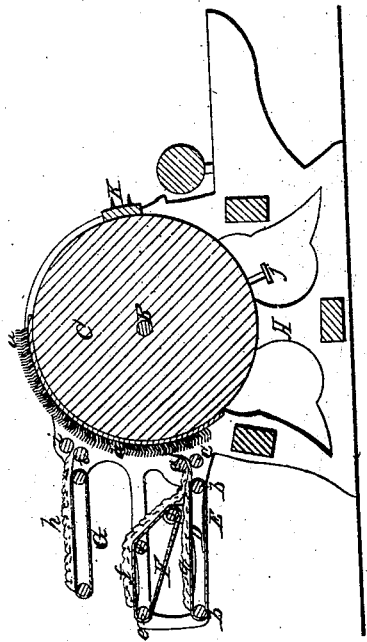
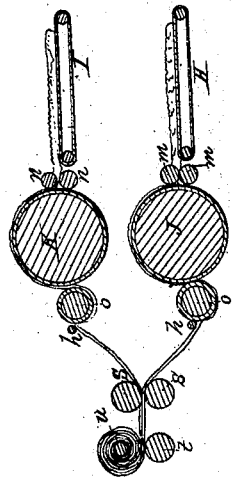
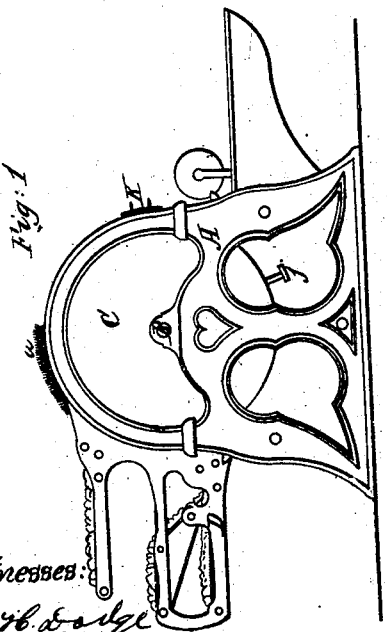
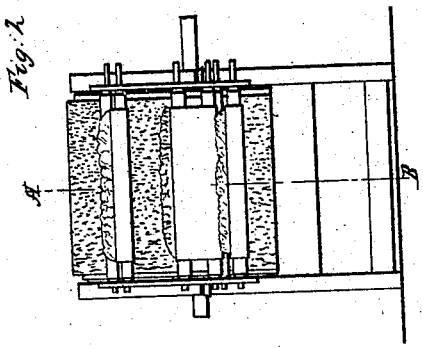
Witnesses:
Thos H Dodge
D L Miller
Inventor:
Daniel Tainter

United States Patent Office

DANIEL TAINTER, OF WORCESTER, MASSACHUSETTS.

Letters Patent No. 67,226, dated July 30, 1867.

---

IMPROVEMENT IN FEEDING APPARATUS FOR CARDING MACHINES.

---

*The Schedule referred to in these Letters Patent and making part of the same.*

---

TO ALL WHOM IT MAY CONCERN:

Be it known that I, DANIEL TAINTER, of the city and county of Worcester, and Commonwealth of Massachusetts, have invented certain new and useful improvements in the Feeding Apparatus of Cotton and Wool-Working Machines; and I do hereby declare that the following is a full, clear, and exact description of the same, reference being had to the accompanying drawings, forming a part of this specification, in which—

Figure 1 represents a side view of so much of a wool-carding machine as is necessary to illustrate my invention.

Figure 2 represents a front view of the feeding device shown in fig. 1.

Figure 3 represents a central section of the device shown in figs. 1 and 2, on line A B, fig. 2.

To enable those skilled in the art to which my invention belongs to make and use the same, I will proceed to describe it in detail.

In the drawings the part marked A represents the main frame, which supports the journal B of the carding-cylinder C, which is to be clothed with carding-teeth $a$, in the usual manner. From the front of frame A projects the table or stand D, which supports a feed-apron, E, that passes around rolls $b\ b$, for the purpose of feeding the cotton or wool to be worked to the feed-rolls $c\ c$, which in turn feed and deliver it to the cylinder C. Such is the plan now in common use, and my improvements consist in combining with said common feed-apron E and carding-cylinder C, or other device for working cotton or wool, of one or more additional feed-aprons F G. In this instance two additional feed-aprons are shown. The feed-apron F passes around rolls $e\ e\ e$, supported in proper framework, and delivers the material $f$, which is placed or spread thereon, to feed-rolls $c\ c$, where it meets the material $g$, which is spread or placed upon feed-apron F, and is fed with that by rolls $c\ c$ to the carding-cylinder, or other working device. Feed-apron G feeds the material $h$, placed or spread thereon, to the feed-rolls $i\ i$, which in turn deliver the material to the carding-cylinder C.

It will be seen that if a certain amount of cotton or wool is weighed and spread upon a given space on feed-apron E, and a certain amount weighed and spread upon feed-apron F and G in like manner, that the material upon the different aprons will be fed to the cylinder C, upon which it will be mixed in a much more even and perfect manner than it could be mixed by hand, while the feed will be more uniform than if the same amount were spread upon a single apron. Again, this plan or mode of feeding enables cotton of different grades to be mixed, or wool of different grades to be mixed, or wool and cotton to be mixed, or cotton and wool of different colors to be mixed, either together or separately in a far more perfect manner than the same can possibly be mixed by hand or in any of the common modes.

Another advantage in feeding the material to the machine from two or more points or places is that more material, whether wool or cotton, can be passed through the machine and properly worked in the same time, by dividing the points of contact with the main cylinder, or other working device, than when the material is fed in from one apron.

My invention is equally applicable to cotton and wool-pickers and lappers as to wool and cotton-cards. It is immaterial, therefore, so far as my improvements are concerned, whether the material is fed to a carding-cylinder, C, with card-teeth $a$, or a beater, having beater-bars or arms $j$, or to a picking-cylinder, having coarse picking-teeth $k$, or any other device for working the material. In lieu of carding-cylinders J and K pickers or beaters may be employed to work the material. In this last-described operation the mixing does not take place until the lap is fed to another machine, but there are many advantages resulting from having two or more separate feed-aprons even in this case. A thicker and more uniform lap can be formed in this way than by the use of a single feed-apron. Then, again, different-colored material, or materials of different grades, can be laid together in a lap in a very even and perfect manner, and thus greatly aid the perfect mixing of the materials when they are subjected to that operation. By the use of three or more feed-aprons, all delivering the material or materials into one machine to be finally united in one lap, still greater advantages would be obtained.

My invention may be applied with good effect in cases where different colors or different grades of staples of wool or cotton are to be mixed, as they pass into a picker and then thrown out into a mass to be thereafter fed into a carding machine, either upon double or single aprons.

My invention contributes greatly to the production of roving or threads of uniform size and weight, in addition to the various other advantages before referred to.

Having described my improved feeding apparatus for wool and cotton-cards, pickers, and lappers, what I claim therein as new and of my invention, and desire to secure by Letters Patent, is—

The combination, with a carding machine, picker, or lapper, of two or more feed-aprons or creepers, arranged relatively to each other, as herein described, so as to deliver the material they carry to a single set or pair of feed-rolls.

DANIEL TAINTER.

Witnesses.
  THOS. H. DODGE,
  D. L. MILLER.